United States Patent [19]
Spettel et al.

[11] Patent Number: 5,629,705
[45] Date of Patent: May 13, 1997

[54] HIGH RANGE RESOLUTION RADAR SYSTEM

[75] Inventors: Aaron Spettel, Oak Leaf, Tex.; Anthony J. Sarantakis, Acton, Mass.

[73] Assignee: Raytheon Company, Lexington, Mass.

[21] Appl. No.: 605,341

[22] Filed: Feb. 9, 1996

[51] Int. Cl.$^6$ ................................................ G01S 13/72
[52] U.S. Cl. .................................. 342/62; 342/75; 342/97
[58] Field of Search ................................. 342/62, 75, 97

[56] References Cited

U.S. PATENT DOCUMENTS

| | | | |
|---|---|---|---|
| 3,918,060 | 11/1975 | Alpers | 342/97 |
| 4,136,343 | 1/1979 | Heffner et al. | 342/427 |
| 4,338,602 | 7/1982 | Roeder et al. | 342/62 |
| 4,524,359 | 6/1985 | Champagne | 342/89 |

*Primary Examiner*—John B. Sotomayor
*Attorney, Agent, or Firm*—Donald F. Mofford

[57] ABSTRACT

A radar system is provided to track radar energy reflected by a point on the target different from the centroid of a target's radar reflected energy. The radar system includes a target angle/range tracking system and a target energy monitoring/range tracking system. During a first mode of operation, the target angle/range tracking system tracks the centroid of the target's reflected energy; and, the target energy monitoring/range tracking system monitors the strength of energy reflected from points, or regions along the body of the target different from the centroid reflected energy producing region. When the signal strength to noise ratio (i.e., S/N ratio) from a reflection at one of the monitored points along the target exceeds a predetermined level indicating detection of a secondary reflector along the body of the target, a second operation mode commences. During the second operating mode, the target angle/range tracking system tracks the energy from the secondary reflector and the target energy monitoring/range tracking system monitors energy reflected from points along the target's body different from the secondary reflector.

5 Claims, 10 Drawing Sheets

FIG. 7A TIME-TO-GO IN GUIDANCE TIME CONSTANTS  $t_G$

FIG. 7B TIME-TO-GO GUIDANCE CONSTANTS  $t_G$

FIG. 8

HIGH RANGE RESOLUTION RADAR SYSTEM

BACKGROUND OF THE INVENTION

This invention relates generally to radar systems and more particularly to radar systems adapted to track energy reflected by a point on a target different from the centroid of a target's radar reflected energy.

As is known in the art, a radar system includes a transmitter and antenna for transmitting and directing radar energy towards a target. The target reflects portions of the transmitted energy. A portion of the reflected energy is received by the antenna and is directed to a receiver of the radar system. In response to the received energy, the receiver produces signals to enable the radar system to track the target. The tracking signals generally track the centroid of the target's reflected energy. Thus, for example, where the radar system is carried by a missile to intercept an incoming target, the tracking signals are fed to both the antenna and to the missile's guidance system; in each case, however, because the signals are produced from the centroid of the target's radar reflected energy the missile will be directed towards the centroid of the reflected energy.

SUMMARY OF THE INVENTION

In accordance with the present invention, a radar system is provided to locate and track radar energy reflected by a point on a target different from the centroid of a target's radar reflected energy. The radar system includes a target angle/range tracking system and a target energy monitoring/range tracking system. During a first mode, or phase of operation: the target angle/range tracking system tracks the centroid of the target's reflected energy; and, the target energy monitoring/range tracking system monitors the strength of energy reflected from scattering points, or regions, along the body of the target different from the centroid reflected energy producing region. When the signal strength to noise ratio (i.e., S/N ratio) from a reflection at one of the monitored points along the target exceeds a predetermined level, indicating detection of a secondary reflector along the body of the target, a second operation mode, or phase commences. During the second operating mode, or phase, the target angle/range tracking system tracks the energy from the secondary reflector and the target energy monitoring/range tracking system monitors energy reflected from points along the target's body different from the secondary reflector.

In a preferred embodiment of the invention, the target is an incoming tactical ballistic missile (TBM) and the radar system is carried by a guided, interceptor missile. During the first mode of operation, the centroid of the reflected energy is located near the rear, tail section of the incoming missile, the target angle/range tracking system tracks such energy and directs the missile toward the rear, tail section of the incoming missile. The target energy monitoring/range tracking system monitors the strength of reflected energy from points along the body of the target forward of the rear, tail section of the incoming missile. When the signal strength to noise ratio (i.e., S/N ratio) from a reflection at one of the monitored points along the incoming missile forward of the centroid exceeds a predetermined level indicating detection of the secondary reflector, the second operation mode commences. During the second operating mode, the target angle/range tracking system tracks the energy from the secondary reflector and directs the interceptor missile towards the forwardly located secondary reflector and the target energy monitoring/range tracking system monitors energy reflected from points along the target's body forward of the detected secondary reflector. When the signal strength to noise ratio (i.e., S/N ratio) from a reflection at one of the monitored points along the incoming missile forward of the previously secondary reflector exceeds a predetermined level, a third operation mode commences. The process continues until the radar system tracks the forward most, adequately reflecting reflector of the incoming missile and directs the missile towards this reflector from signals produced by such tracked energy. It is assumed that this forward most reflector is the incoming missile's most vulnerable area.

Finally, at a predetermined short time prior to intercept, if a "secondary" reflector is detected by the target energy monitoring/range tracking system further toward of the region being angle/range tracked by the target angle/range tracking system, a target aim point adjustment phase commences. If a further forward "secondary" reflector is detected, it is assumed that it is now the most vulnerable area. Constraints of time and low energy return from the furthest most reflector prevent the transitioning of the target angle/range tracking system to tracking the "secondary reflector". During the target aim point adjustment phase, an adjustment to the target aim point for guidance is calculated from an estimate of the intercept geometry and the difference in range obtained from the target energy monitoring/range tracking system and the range obtained from the target angle/range tracking system. More particularly, a vector, $\overline{A}$, is computed having as magnitude, the difference in range between the target energy monitoring/range tracking system and the angle/range tracking system and having as direction a unit vector along the target velocity. A vector, $\overline{B}$, is also calculated, such vector $\overline{B}$ being the missile to target range vector obtained from the target angle/range tracking system measurements. A vector $\overline{C}$, is calculated, where $\overline{C}$ is the vector sum of the vector $\overline{B}$ and the vector $\overline{A}$. Vector $\overline{C}$ represents an estimate of the range vector from the missile to the "secondary reflector". The range and angle data of vector $\overline{C}$ is used as the inputs to the aim point correction to guide the interceptor missile to the secondary reflector.

DESCRIPTION OF THE PREFERRED EMBODIMENTS

Figure 1:
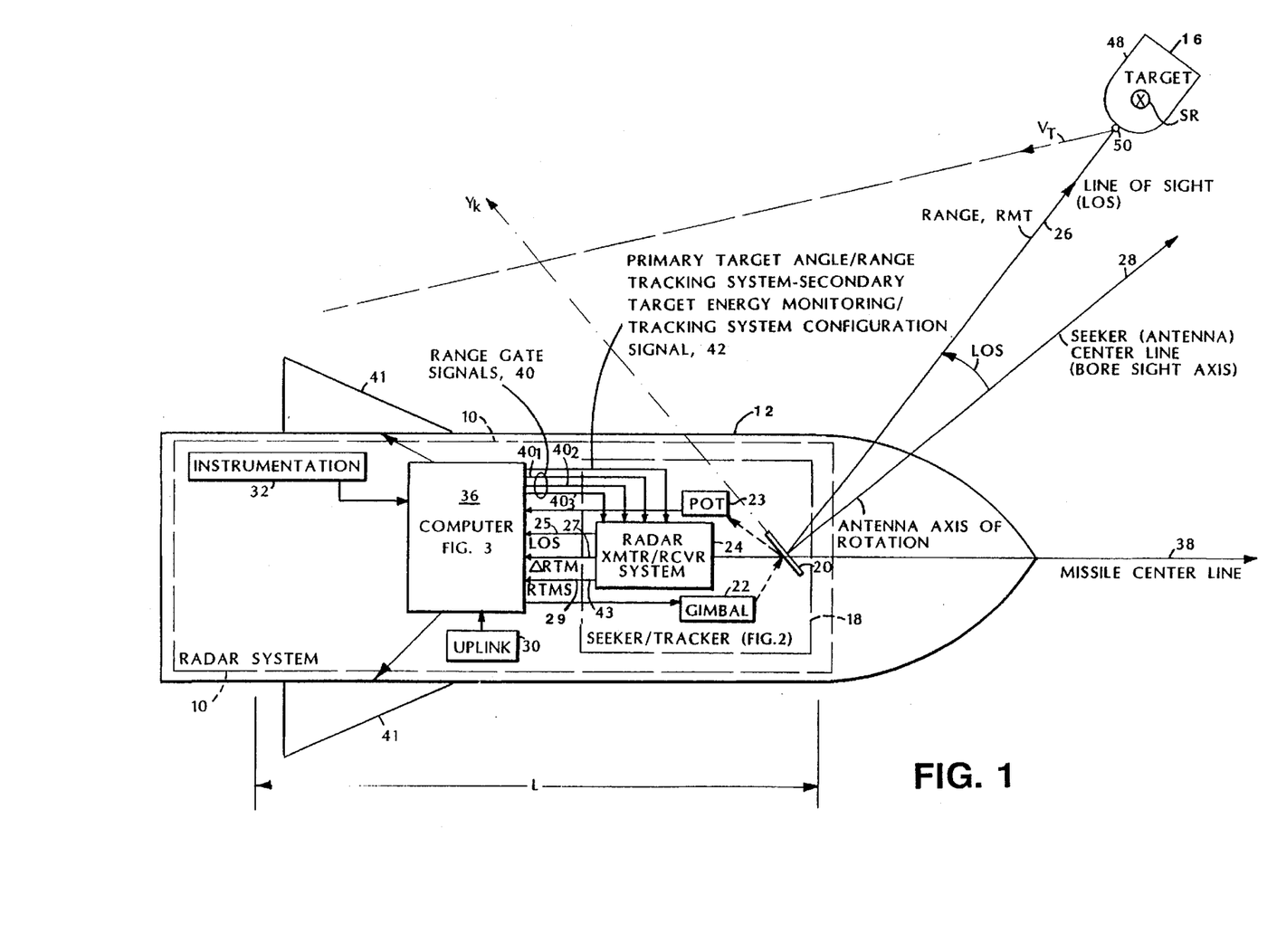
FIG. 1 is a diagrammatical sketch of a radar guided missile tracking, and being directed towards, an incoming target by a radar system according to the invention, such FIG. 1 showing a block diagram of the radar system carried by the missile.

Referring now to FIG. 1, a radar system 10 is shown adapted for use by a guided interceptor missile 12 to intercept a target 16, here an incoming tactical ballistic missile (TBM). The radar system 10 includes a target seeker/tracker 18, here made up of a conventional monopulse antenna 20, gimballed by a gimbal system 22, in a conventional manner, with respect to the body of the missile 12; pitch/yaw gimbal potentiometers 23, mounted to the gimballed antenna 20 for producing signals representative of the pitch/yaw gimbal angles of the antenna 20 relative to the missile's body 12; and, a conventional radar transmitter/receiver 24, here a pulsed Doppler radar transmitter/receiver, for producing, during a target angle/range tracking mode: (a) a signal on line 25 representative of the angular deviation, LOS, between the line of sight (LOS) 26 and a region of target 16 reflecting radar being tracked by the radar system 10 and the centerline, or boresight axis 28 of the antenna 20 (i.e., a conventional boresight error angle tracking signal made up of an elevation angle, $\epsilon_{EL}$, LOS component and an azimuth angle, $\epsilon_{AZ}$, LOS component);and, (b) a range error signal, $\Delta R_{TM}$, on line 27 which, together with an initial range signal from the uplink processor 30, is representative of a range between the region of target 16 reflecting the tracked radar reflected energy and the missile 12 along the line of sight 26 (i.e., range $R_{MT}$). During a target energy monitoring/range tracking mode, the radar transmitter/receiver 24 produces a signal $R_{TMS}$, on line 29, representative of the range between the missile 12 and a point on the target 16 reflecting energy forward of the region of target 16 reflecting the energy being tracked in range and angle during the target angle/range tracking mode, and the region to which the missile 12 is being directed, during the target angle/range tracking mode. That is, the signal, $R_{TMS}$, represents the range from the missile 12 to the secondary reflector, SR, of the target 16.

Also included are instrumentation 32 and a computer 36, arranged as shown. The instrumentation 32 is used to measure the acceleration and angular rotation of the missile 12 and the angular rotation of the antenna 20 relative to the body of the missile 12 and for producing signals representative of such measurements for computer 36. The instrumentation 32 includes: a longitudinal accelerometer, not shown, for producing a signal representative of the acceleration mounted to the body of the missile 12, along its longitudinal axis 38; pitch/yaw accelerometers, not shown, mounted to the body of the missile 12, for producing signals representative of accelerations along axis orthogonal to the longitudinal axis 38; pitch/yaw/roll gyros, not shown, mounted to the body of the missile 12 for producing signals representative of the interceptor missile's pitch, yaw and roll angular body motion rates. The measured missile 12 accelerations, and the measured missile 12 angular rates are fed to an inertial guidance system located within the computer 36 for producing signals, $V_M$ and $R_M$, representative of the velocity and position of the missile 12 relative to the ground. The computer 36, in response to signals produced by the seeker/tracker 18, instrumentation 32, and ground uplink processor 30, produces signals to both track energy reflected from target 16 and direct the missile 12 towards such tracked target 16. More particularly, computer 36, in response to the produced angular deviation signal, LOS, the produced range error signal, $\Delta R_{TM}$, signals representative of missile 12 accelerations and rotational rates (produced by instrumentation section 32), and signals representative of the angular position of the antenna 20 relative to the body of the missile 12 (produced by potentiometers 23) generates target angle tracking signals for gimbal 22 to track the target 16 in angle, range gating signals 40 on lines $40_1$, $40_2$, $40_3$ to enable the radar system 10 to track the target 16 in range, and guidance signals for control surfaces 41 to aerodynamically direct the missile 12 towards the tracked target 16. The computer 36 also produces a signal on line 42 for configuring the radar system 10 into a target energy monitoring/range tracking system $46_S$, to be described, and when configured into such target energy monitoring/range tracking system $46_S$, the radar transmitter/receiver 24 produces the signal secondary reflector range signal, $R_{TMS}$, on line 29, representative of the range between the missile 12 and a point on the target 16 reflecting energy forward of target reflecting energy being the tracked in range and angle, and to which the missile 12 is being directed, during the target angle/range tracking mode.

Figure 2A:
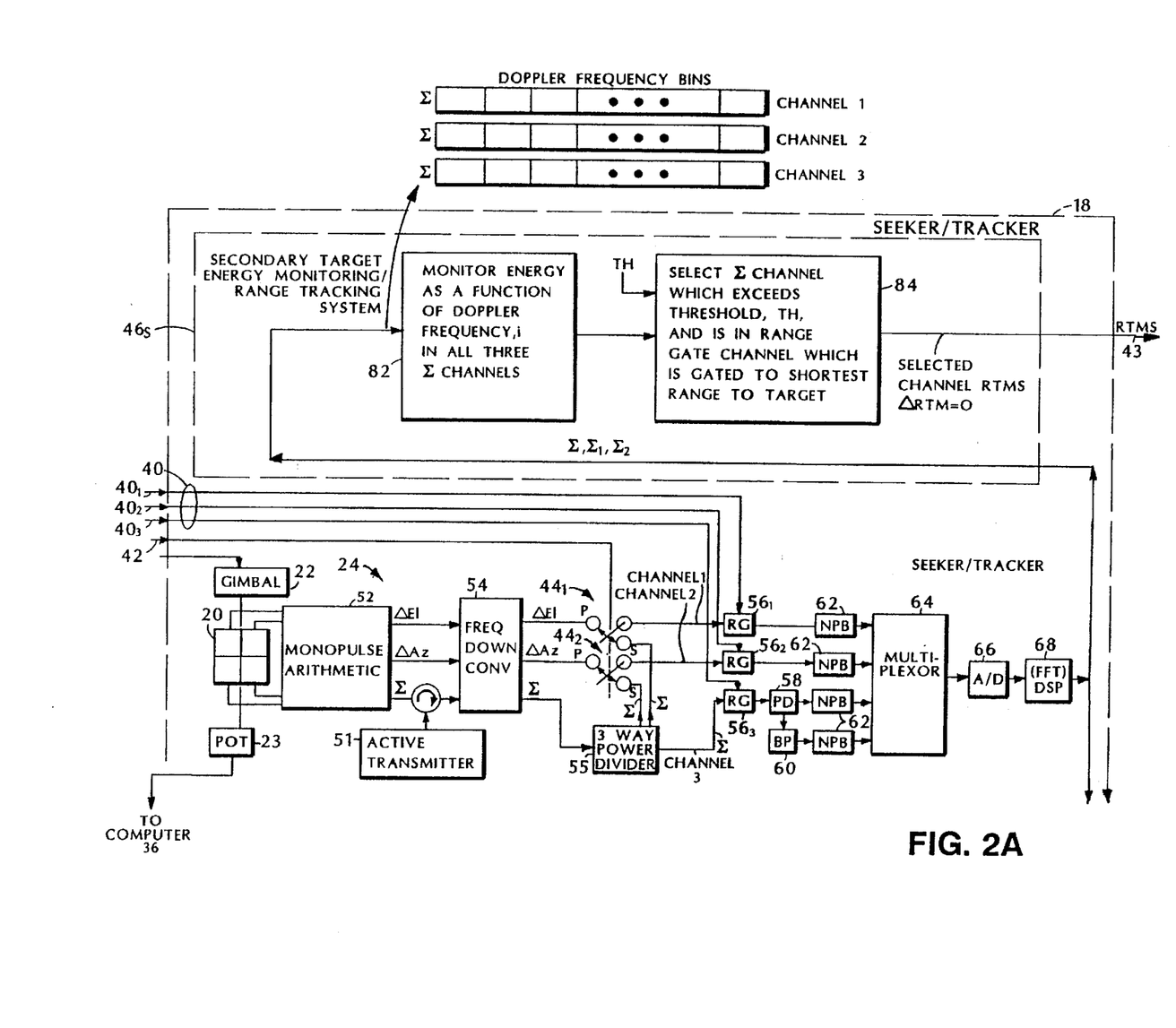
FIG. 2 is a diagram showing the relationship between FIGS. 2A and 2B which together is a block diagram of a target seeker/tracker included in the radar system of FIG. 1.
Figure 2B:
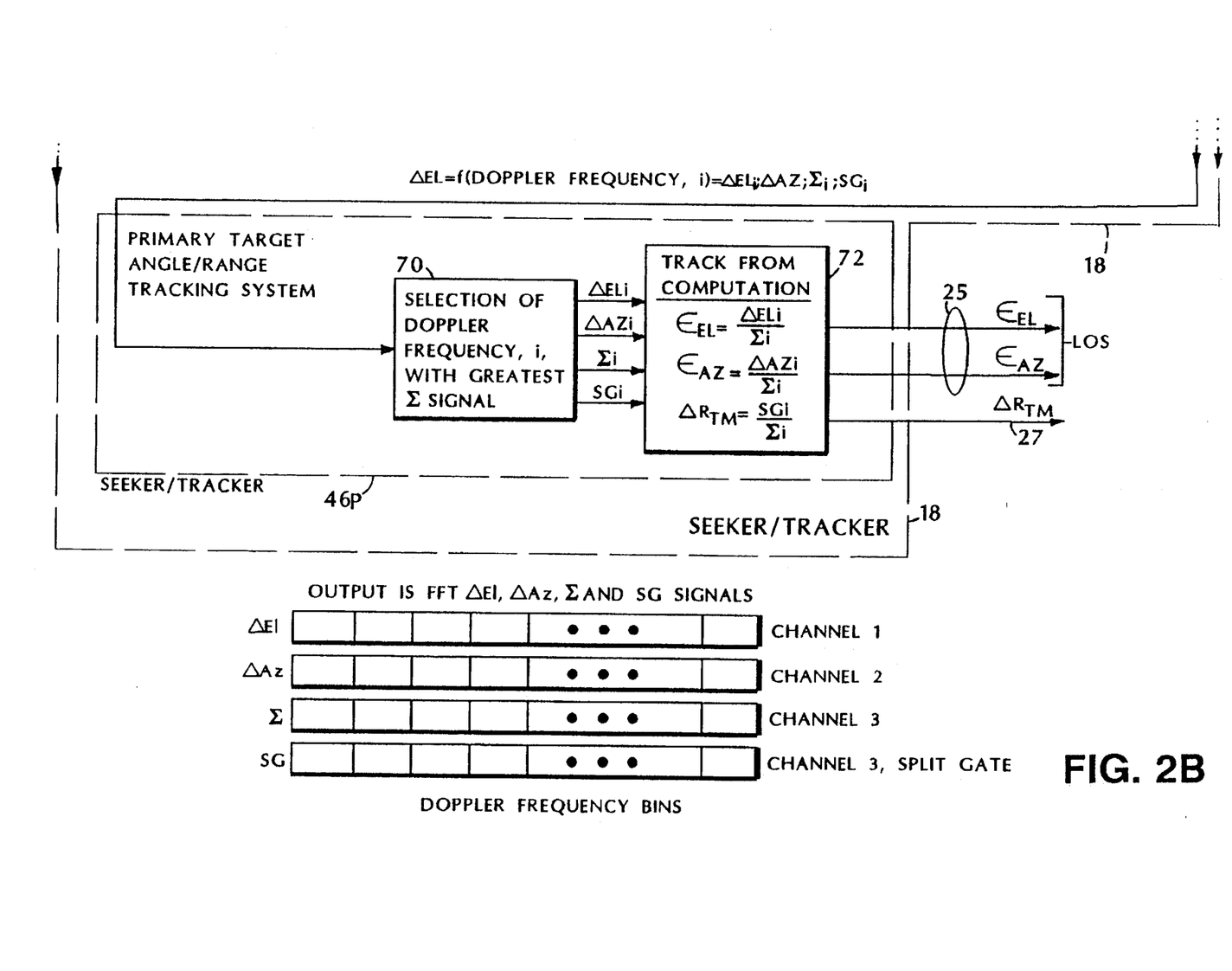
Figure 2C:
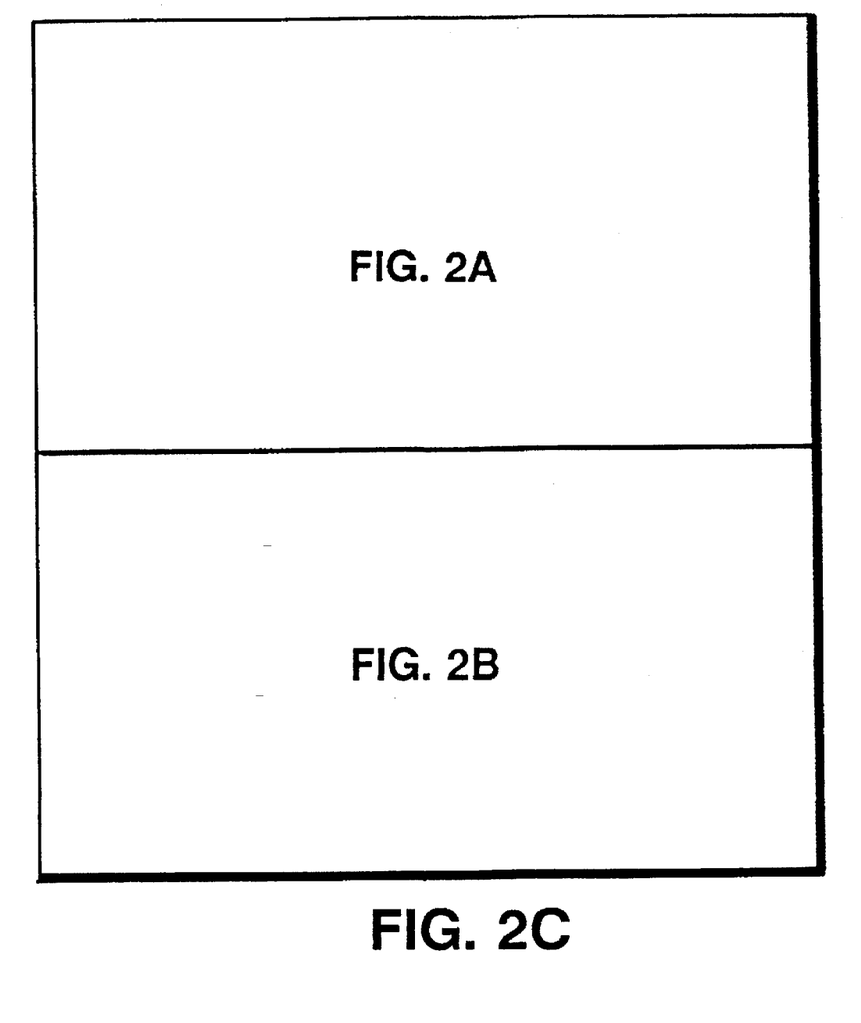
Figure 3:
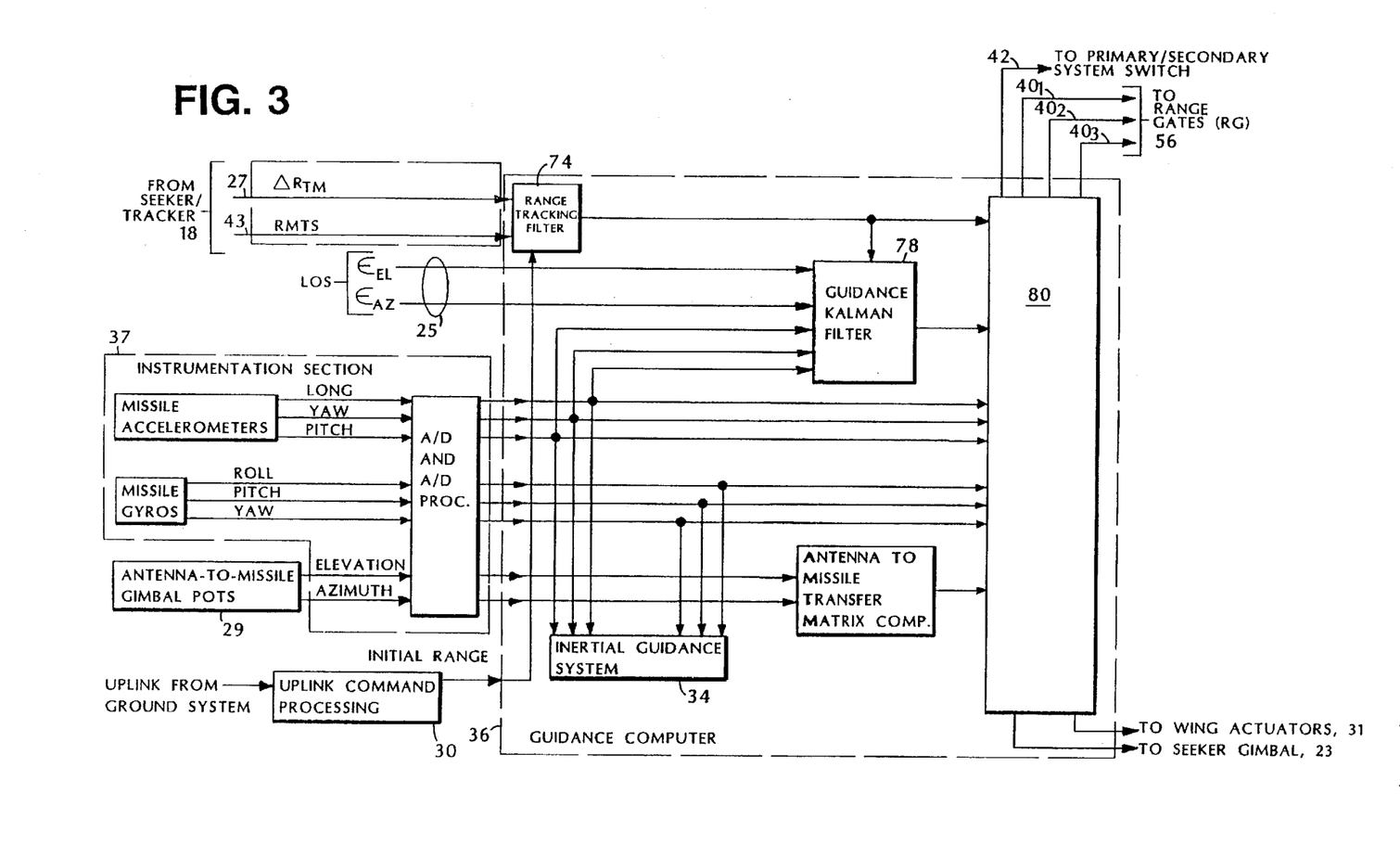
FIG. 3 is a block diagram of a computer included in the radar system of FIG. 1.

More particularly, and referring also to FIGS. 2 and 3 the seeker/tracker 18 of the radar system 10 includes switches $44_1$, $44_2$, which, in response to a control signal fed thereto by computer 36 on line 42, configures the radar system 10 into a target angle/range tracking system (or mode) $46_P$ (i.e., when switches $44_1$, $44_2$, are connected to primary input terminals, P) and a target energy monitoring/range tracking system (or mode) $46_S$ (i.e., when switches $44_1$, $44_2$) are connected to secondary input ports, S. The primary and secondary systems $46_P$, $46_S$, will be described in detail hereinafter. Suffice it to say here, however, the target angle/range tracking system $46_P$ provides the line of sight, LOS, target angle tracking signal and the range error signal $\Delta R_{TM}$ to the computer 36, such signals being derived from radar energy reflected by the target 16 tracked by the target angle/range tracking system $46_P$. During the initial, pre-intercept phase of the interceptor missile's flight (i.e., PHASE 0) the target angle/range tracking system $46_P$ tracks the centroid of the energy reflected by the target 16 and the missile 12 is directed towards the tracked reflected energy centroid. Typically, the centroid of the reflected energy is located near the rear, tail section 48 (FIG. 1) of the incoming missile 16, thus the interceptor missile 12 is directed towards the rear, tail section 48 of the target 12. During PHASE 0, the target energy monitoring/range tracking system $46_S$ is inoperative.

At the initial period of the intercept phase, (i.e., a predetermined time prior to intercept) PHASE 1 commences. During PHASE 1, the target angle/range tracking system $46_P$ still provides target angle and range (i.e., angle/range) tracking of (i.e. at a shorter range to) the centroid of target 16 reflected energy and the missile 12 is directed towards such centroid, but now the target energy monitoring/range tracking system $46_S$ first monitors, and then range tracks, reflected energy from points along the surface of the target 16 forward of the centroid. When the signal to noise (S/N) ratio from a reflection at monitored point along the surface of the target 16 exceeds a predetermined level, TH, detection of a secondary reflector, SR, is indicated and the radar system 10 enters into PHASE 2 of the intercept phase. During PHASE 2, the target angle/range tracking system $46_P$ providing line of sight, LOS, angle and range error, $\Delta R_{TM}$, signals from energy reflected from the secondary reflector, SR, and the target energy monitoring/range tracking system $46_S$ monitors, and then tracks, other points along the surface of the target 16 forward of the secondary reflector, SR. Thus, while, during the PHASE 1, the missile 12 was being directed toward the rear, tail positioned centroid of the incoming missile 16 and the second tracking system monitors reflections from points of the forward of the rear, tail section, during PHASE 2, the missile 12 is directed towards a point forward of the tail of the incoming target 16; i.e., towards the secondary reflector, SR. The process continues to change as described until the radar system 10 target angle/range tracking system $46_P$ tracks the forward most, adequately reflecting reflector of the incoming target 16; i.e., the incoming target's most vulnerable area, its nose 50, and the missile 12 is directed towards the nose 50 of the incoming missile 16.

Finally, at a predetermined short time prior to intercept, if a "secondary" reflector is detected by the target energy monitoring/range tracking system $46_S$, further toward of the region being angle/range tracked by the target angle/range tracking system $46_P$, a target aim point adjustment phase commences. If a further forward "secondary" reflector is detected, it is assumed that it is the most vulnerable area. Constraints of time and low energy return from the furthest most reflector prevent the transitioning of the target angle/range tracking system to tracking the "secondary reflector". During the target aim point adjustment phase, an adjustment to the target aim point for guidance is calculated from an estimate of the intercept geometry and the difference in range obtained from the target energy monitoring/range tracking system and the range obtained from the target angle/range tracking system. More particularly, a vector, $\overline{A}$, is computed having as magnitude, the difference in range between the target energy monitoring/range tracking system and the angle/range tracking system and having as direction a unit vector along the target velocity. A vector, $\overline{B}$, is also calculated, such vector $\overline{B}$ being the missile to target range vector obtained from the target angle/range tracking system measurements. A vector $\overline{C}$, is calculated, where $\overline{C}$ is the vector sum of the vector $\overline{B}$ and the vector $\overline{A}$. Vector $\overline{C}$ represents an estimate of the range vector from the missile to the "secondary reflector". The range and angle data of vector $\overline{C}$ is used as the inputs to the aim point correction to guide the interceptor missile to the secondary reflector.

Figure 4:
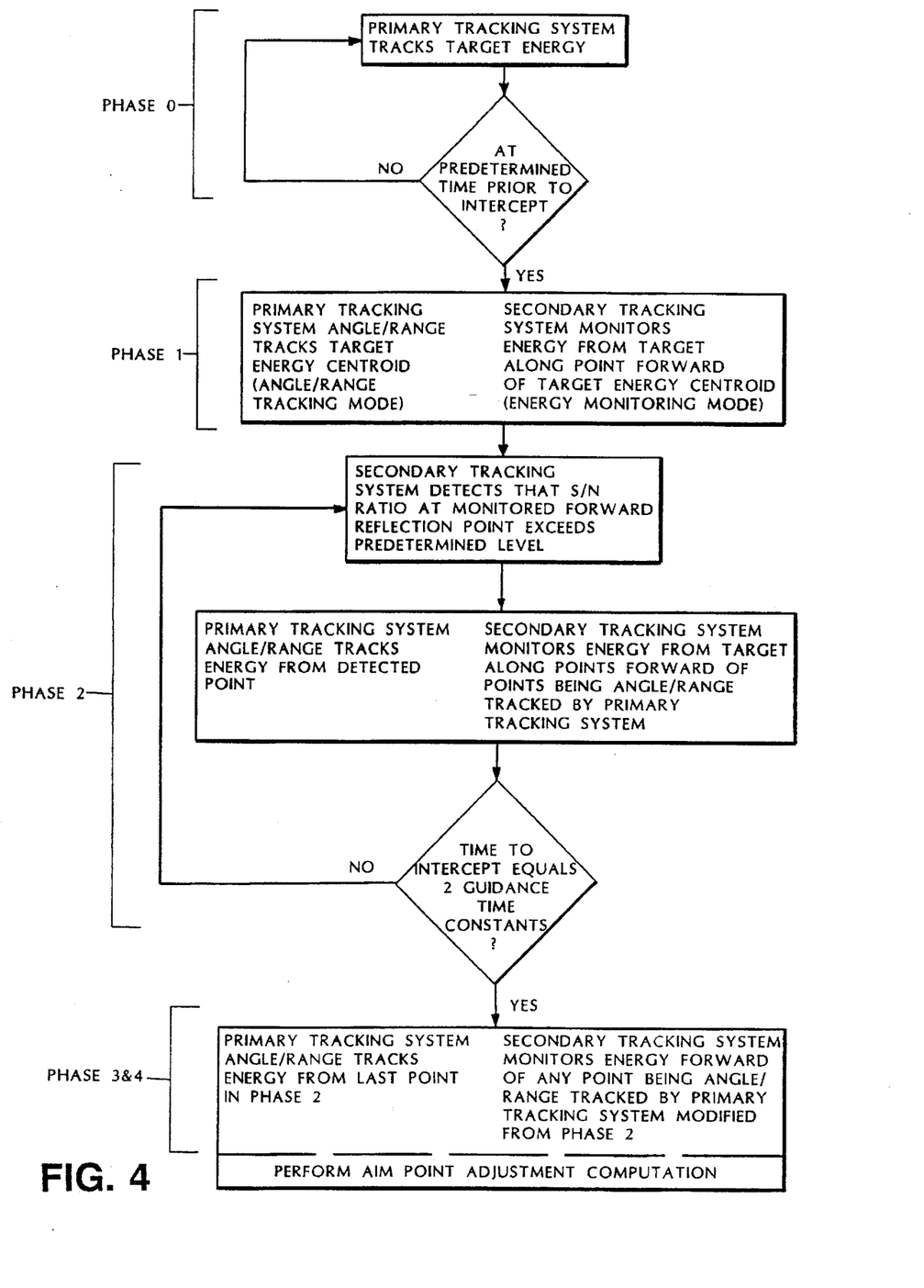
FIG. 4 is a flow diagram summarizing the operation of the radar system of FIG. 1.

The process described above is summarized in the flow diagram shown in FIG. 4.

Referring now in more detail to FIG. 2, the radar transmitter/receiver 24 includes an active transmitter 51 for generating radio frequency (RF) pulses which are transmitted to the target 16 through the antenna 20. Here, the transmitter 51 transmits relatively short pulses of RF energy in response to trigger signals produced by computer 36 (FIG. 1), in a conventional manner. Here, the radar system 10 is configured to provide four dwells per radar cycle, each dwell having in the order of 500–5000 transmitted RF pulses per dwell. Thus, in order to retrieve sufficient RF energy for processing, 500–5000 radar returns are collected for proving a composite radar return signal, or dwell. The return RF signals reflected from the target 16 are received by the monopulse antenna 20 and processed by a monopulse arithmetic 52. The monopulse arithmetic unit 52 is of conventional design and generates, for each one of the four dwells per radar cycle, an elevation signal, $\Delta EL$, a azimuth signal, $\Delta AZ$, and sum signal, $\Sigma$, in a conventional manner. These RF signals are frequency down converted to a baseband low frequency in a conventional down converter 54. The down converted elevation signal, $\Delta EL$, azimuth signal, $\Delta AZ$, respectively, are fed to a primary tracking system input, P, of a pair of switches $44_1$, $44_2$, respectively, as shown. The down converted sum signal, $\Sigma$, is fed to a three way power divider 55, as shown. Two of the three outputs of the three way power divider 55 are fed to a secondary tracking system input, S, of the pair of switches $44_1$, $44_2$, respectively, as shown. The third output of the three way power divider 55 is fed to range gate $56_3$, as shown. The outputs of switches $44_1$, $44_2$ are fed to range gates $56_1$, $56_2$, respectively, as shown. The operation of the range gates $56_1$, $56_2$, $56_3$ and the switches $44_1$, $44_2$ are controlled by signals 40 from computer 36 on lines $40_1$, $40_2$, $40_3$, respectively, and line 42, in a manner to be described in detail hereinafter, Suffice it to say here, however, that in response to the signal on line 42, when the switches $44_1$, $44_2$ are coupled to primary tracking inputs P, the target angle/range tracking system $46_P$ is provided and when the switches $44_1$, $44_2$ are connected to secondary tracking inputs S, the target energy monitoring/range tracking system $46_S$ is provided. The radar gates $56_1$, $56_2$, $56_3$ are fed by signals at outputs of switches $44_1$, $44_2$, and the first output of the three way power divider 55, respectively as shown. Thus, signals in three channels, channel 1, channel 2, and channel 3, are fed to range gates $56_1$, $56_2$, $56_3$, respectively, as shown. For the target angle/range tracking system $46_P$, the signals fed to the range gates $56_1$, $56_2$, $56_3$ in channels 1, 2, and 3, respectively, are the down converted elevation signal, $\Delta EL$, azimuth signal, $\Delta AZ$, and sum signal, $\Sigma$, respectively. However, for the target energy monitoring/range tracking system $46_S$, the signal fed to the range gates $56_1$, $56_2$, $56_3$ in channels 1, 2, and 3, respectively, is the same, down converted sum signal, $\Sigma$.

PHASE 0

As noted above, during PHASE 0, the target angle/range tracking system $46_P$ tracks the centroid of the energy reflected by the target 16, the missile 12 is directed towards the tracked target reflected centroid energy, and the target energy monitoring/range tracking system $46_S$ is inoperative. Thus, during PHASE 0 switches $44_1$, $44_2$ are connected to the primary tracking input P, the output of range gate $56_3$ is fed to a power divider 58, the sum channel signal (i.e., channel 3) is sent through a bi-phase switch 60 which inverts the sum channel signal phase angle by 180 degree at one half way through the width of the range gate to produce a conventional split gate signal, SG. This is generally referred to as a split gate. The now four channel signals (i.e., $\Delta EL$, $\Delta AZ$, $\Sigma$ and SG) are narrow pass band, NPB, filtered in narrow band filters 62, before entering the multiplexer 64. The multiplexer 64 samples each of the four channel signals (i.e., $\Delta EL$, $\Delta AZ$, $\Sigma$ and SG) sequentially in time. This produces a single channel time series of analog samples of delta elevation $\Delta EL$, delta azimuth, $\Delta Az$, sum, $\Sigma$ and split gate signal SG.

Figure 5A:
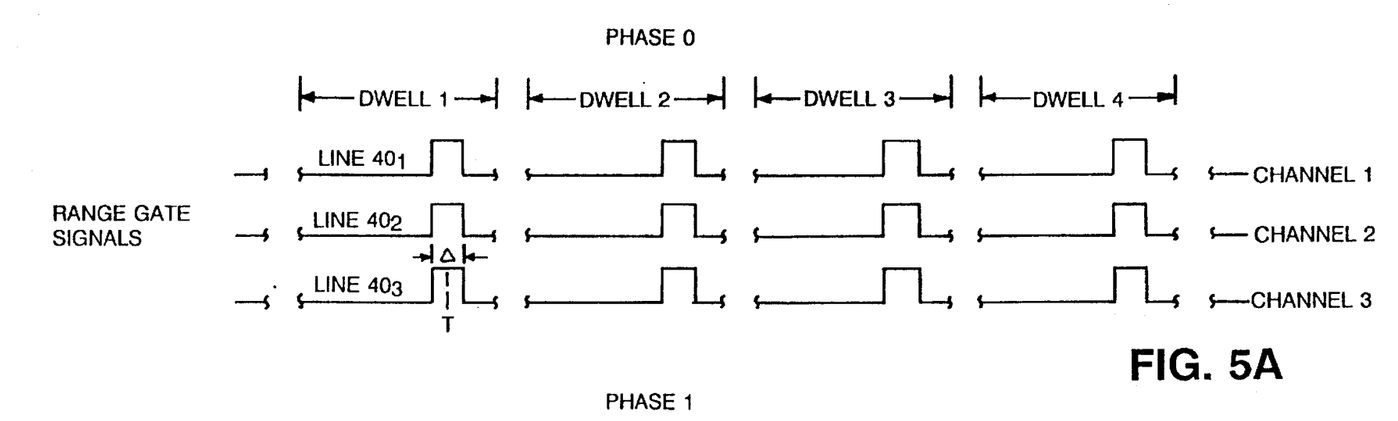
FIGS. 5A and 5B are timing diagrams useful in understanding the operation of the radar system of FIG. 1, FIG. 5A being a timing diagram showing range gating signals fed to range gates of the radar system of FIG. 1 prior to the missile of FIG. 1 entering a high range resolution target intercept phase, that is during PHASE 0, and FIG. 5B being a timing diagram showing range gating signals fed to range gates of the radar system of FIG. 1 after the missile of FIG. 1 enters the high range resolution target intercept phase, that is during PHASE 1.
Figure 6A:
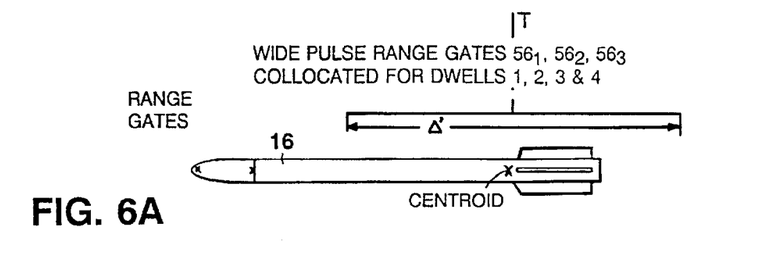
FIGS. 6A to 6E are diagrams showing the relationship between the range gating signals used by the radar system of FIG. 1 and the portions of the target reflecting radar energy being monitored and range tracked by the radar system of FIG. 1.

These analog amplitude samples are analog-to-digital converted (A/D) 66 and processed by the Digital Signal Processor (DSP) 68 which is a special purpose dedicated computer. The DSP 68 computes the complex components of each of the four signals for each doppler frequency bin using a Fast Fourier Transform (FFT) algorithm. The information obtained by the DSP is fed, in the primary operating mode, to a Doppler selection processor 70, in a conventional manner. The angle tracking error calculation 72 of the line of sight LOS signal, more particularly the elevation angle ($\epsilon_{EL}$), azimuth angle ($\epsilon_{AZ}$) signals, and missile-to-target range error ($\Delta R_{TM}$) are computed using conventional complex (i.e., a+jB) arithmetic. (It should be noted that while the Doppler selection 70 and tracking error 72 are shown functionally in the seeker/tracker 20 because the computations are performed in response to signals produced by the seeker/tracker 20, the computations are performed by the computer 36). The processor 80 (FIG. 3) provides the range gating signals to the range gates $56_1$, $56_2$, $56_3$, on lines $40_1$, $40_2$, $40_3$, respectively, to range gate the signals fed thereto, in a conventional manner, about the predicted arrival time of each return pulse (here about the centroid, C), as shown in FIGS. 5A, 6A. Here, for example, a predicted time, T, and a range gating window of, here, $\Delta$ centered at T. Thus, here the range gate window extends from T–($\Delta$/2) to T+($\Delta$/2). Here, during PHASE 0, all the returns for all four dwells per radar cycle are used to produce target angle/range tracking signals and, as shown in FIG. 5A, 6A all four dwells track the centroid of the reflected target energy which is typically positioned near the rear, tail section of the target. Thus, here the centroid is within the range gate window which extends from T–($\Delta$/2) to T+($\Delta$/2).

More particularly, referring also to FIGS. 2 and 3, the range error signal $\Delta R_{TM}$ is an input to the range tracking filter 74. The range tracking filter 74 receives an initial value of range, $R_{TMO}$ from a ground uplink, not shown, to an uplink processor 30, in a conventional manner. Thus, the computer 36 uses the measured missile-to-target range (i.e., $R_{TMO}$ and $\Delta R_{TM}$) as inputs to a conventional guidance Kalman filter 78. The elevation angle $\epsilon_{EL}$ and azimuth angle $\epsilon_{Az}$ (i.e., the line of sight LOS boresight error signal azimuth and elevation signals), are also inputs to the guidance Kalman filter 78. The guidance Kalman filter 78 outputs also include the rate of change in the line of sight (i.e., LOS rates), such output being fed to the processor 80 of the computer 36, as shown. The other inputs to the processor 80 include outputs from the instrumentation section 37 (i.e., missile 12 accelerometers and gyros and antenna-to-missile gimbal potentiometers) and command parameters uplinked from the ground radar system, not shown, to the uplink processor 30, as described in copending patent application Ser. No. 08/498,936 filed Jul. 6, 1995 and assigned to the same assignee as the present invention, the contents of such copending patent application being incorporated herein by reference, and the output of the inertial guidance system within the computer 36.

Thus, during PHASE 0, the range gate signals producing the above described range gate window which is centered at T and which extends from T–($\Delta$/2) to T+($\Delta$/2) is used by all three range gates $56_1$, $56_2$, $56_3$ in a conventional manner to enable the radar system 10 to track the rear, tail located centroid, C, of the target 16 reflected energy and guide the missile 12 towards such tracked energy in a conventional manner.

PHASE 1

TARGET ANGLE/RANGE TRACKING SYSTEM $46_p$

Figure 5B:
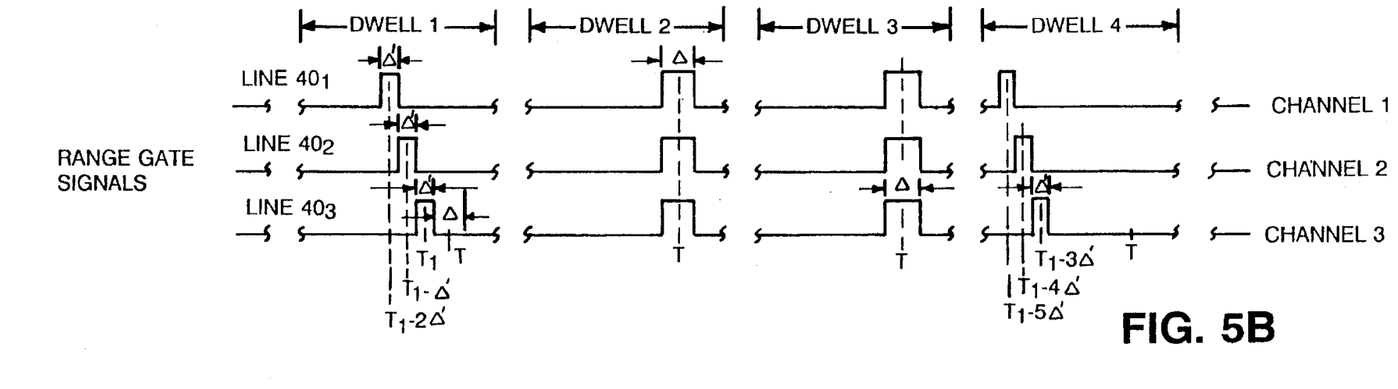
Figure 6B:
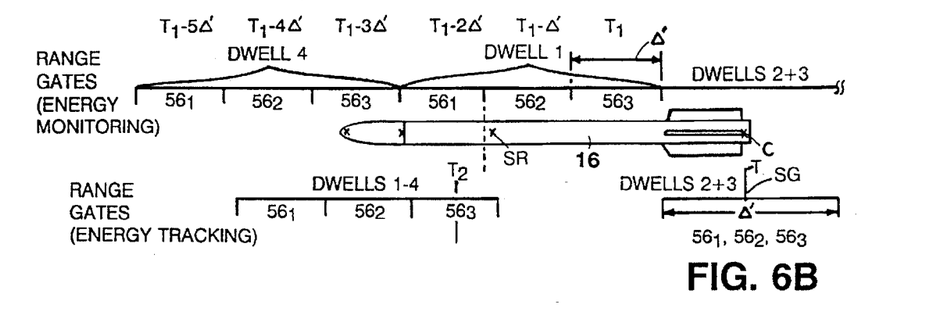

At eight to ten or more guidance time constants prior to intercept (i.e., time-to-go, $t_{GO}$) the target angle/range tracking system $46_p$ and target energy monitoring/range tracking system $46_S$ share the energy in the four dwells per radar cycle, as shown in FIGS. 5B and 6B. More particularly, here during the second and third dwells the target angle/range tracking system $46_p$ tracks the centroid, C, of the target 16 reflected energy; i.e. the range gates $56_1$, $56_2$, $56_3$ in all three channels are gated with a gating signal on lines $40_1$, $40_2$, $40_3$ having a time duration, or window, $\Delta$, centered at time T, where T is representative of the range between the missile 12 and the centroid, C, of the target 16 reflected energy. Therefore, the energy in second and third dwells directs the missile 12 towards the energy tracked centroid, C, as in PHASE 0 and during the first and fourth dwells the target energy monitoring/range tracking system $46_S$ using shorter width range gates (i.e., finer range resolution), to be described in detail hereinafter, monitors different points along the target 16 forward of the centroid, C, (i.e. at a shorter range than the range to the centroid, C) during the first and fourth dwells.

TARGET ENERGY MONITORING/RANGE TRACKING SYSTEM, $46_S$

During the first and fourth dwells of PHASE 1, the switches $44_1$, $44_2$ are connected to secondary tracking input, S, (FIG. 2) so that the sum signal, $\Sigma$, is fed to all three range gates $56_1$, $56_2$, $56_3$ and the target energy monitoring/range tracking system $46_S$ is thereby provided. Further, during the first and fourth dwells the gating signals on lines $40_1$, $40_2$, $40_3$ fed to the range gates $56_1$, $56_2$, $56_3$ are initiated at different times and having finer range resolution, to be described in detail hereinafter, so that each one of the range gates $56_1$, $56_2$, $56_3$ passes energy reflected from a different point on the target 16, as shown in FIGS. 5B and 6B. Here, as noted above, the range gating signals on lines $40_1$, $40_2$, $40_3$ used by the target angle/range tracking system $46_p$ during the second and third dwells in PHASE 1 is centered at T and extends from T–$\Delta$/2 to T+$\Delta$/2, as shown in FIGS. 5B, 6B. Thus, here, during the first dwell of PHASE 1, the range tracking signals for range gating signals on lines $40_1$, $40_2$, $40_3$ for range gates $56_1$, $56_2$, $56_3$, respectively, of the target energy monitoring/range tracking system $46_S$ have a duration $\Delta'$ (where $\Delta'=(\frac{1}{6})\Delta$), and are centered at T–($\Delta$/2)–($\Delta'$/2)=$T_1$, $T_1$–$\Delta$, and, $T_1$–$2\Delta'$, respectively, as shown in FIGS. 5B and 6B. Thus, the range gating signals for range gates $56_1$, $56_2$, $56_3$, of the target energy monitoring/range tracking system $46_S$ extend from $T_1$–($\Delta'$/2) to $T_1$+($\Delta'$/2), $T_1$–($\Delta'$/2)–$\Delta$ to $T_1$–($\Delta'$/2), and $T_1$–($\Delta'$/2)–$2\Delta'$ to $T_1$–($\Delta'$/2)–$\Delta'$, respectively. Thus, for the secondary energy monitoring/range tracking system $46_S$ (i.e., when switches $44_1$, $44_2$ are connected to secondary inputs, S, the centers of the range gate windows for channels 3, 2 and 1 during the first dwell are at T–($\Delta$/2)–($\Delta'$/2)=$T_1$, $T_1$–$\Delta'$, and, $T_1$–2, respectively, and such channels monitor reflections from the target 16, respectively, successively forward of the centroid, C, shown in FIGS. 5B and 6B. That is, during the first dwell, the range gates $56_1$, $56_2$, $56_3$ track energy at ranges to the target which are successively shorter than the range to the centroid, C. Likewise, during the fourth dwell of PHASE 1 the range tracking signals on lines $40_1$, $40_2$, $40_3$ for range gates $56_1$, $56_2$, $56_3$ are selected so that channels 3, 2 and 1 monitor reflections from the target 16, respectively, successively forward of the energy being monitored by channel 1 during the first dwell of PHASE 1, as shown in FIGS. 5B and 6B. Thus, during the fourth dwell of PHASE 1 the center of the range gate windows for channels 3, 2, and 1 are $T_1$–$3\Delta'$, $T_1$–$4\Delta'$, and, $T_1$–$5\Delta'$, respectively, each having a window $\Delta'$, and such channels monitor reflections from the target, respectively, successively forward of the point being monitored by channel 1 during the first dwell of PHASE 1, as shown in FIGS. 5B and 6B.

More particularly, the target energy monitoring is provided by the target energy monitoring/range tracking system $46_S$ during the first and fourth dwells as follows: After passing through power divider 58, narrow band filters 62, multiplexers 64, analog to digital converters 66, and DSP 68, the energy as a function of Doppler frequency is monitored in all three sum signal, Σ channels, albeit that the energy being monitored in each of the channels 1, 2 and 3 is from reflections at different points, or regions, along the body of the target 16, labeled 82 in FIG. 2. When, during either the first or fourth dwells, one of the three signal, Σ channels (i.e. channels 1, 2 and 3), has an energy level greater than the predetermined threshold level, TH, (labeled 84 in FIG. 2) a target reflector, SR, is detected and the signal $R_{TMS}$, representative of the range to the detected secondary reflector, SR, (FIG. 1) is fed to the computer 36 via line 29 and such signal, $R_{TMS}$, is used by the processor 80 during PHASE 2 to establish the range gating signals 40 (i.e., the signals on lines $40_1, 40_2, 40_3$, for the target angle/range tracking system $46_P$ to track the energy from the secondary reflector, SR, and thereby guide the missile 12 towards the secondary reflector, SR. (If two channels exceed the threshold, the one with the shortest range to the intercepting missile 12 is selected as the secondary reflector, SR). The upper portion of FIG. 6B depicts where each of the channels is 'looking' relative to the target 16 body or airframe for each dwell, through use of the range gates $56_1, 56_2, 56_3$ (i.e., the energy monitoring phase of the target energy monitoring/range tracking system $46_S$). When a secondary reflector, SR, is being searched for in front of the centroid, C, the range gates $56_1, 56_2, 56_3$ in channels 1, 2 and 3 are spread out over time, and hence over range, to view as much range extent along the target 16 as possible. If, for example the secondary reflector, SR, is from energy received in the channel 2 during the first dwell, the target energy monitor/range tracking system $46_S$ determines the range $R_{TMS}$ to the secondary reflector, SR, and feeds such range $R_{TMS}$ signal to the monitor/range tracking filter 34 via line 29. The processor 80 produces range gate signals on lines $40_1, 40_2, 40_3$ to place the secondary reflector, SR, at the center of the range gate window used for channel 3 during both the first dwell, here $T_1-\Delta'=T_2$ for the range gate in channel 3; the range gates in channels 2 and 1 having range gating signals centered at $T_2-\Delta'$, and $T_2-2\Delta'$, respectively and the fourth dwell, as shown at the bottom of FIG. 6B (i.e., the target energy tracking mode of the target energy monitoring tracking system $46_S$). Thus, once a secondary reflector, SR, is detected, the range channels are partially collapsed, as shown in the bottom of FIG. 6B, to where channel 3 with the split gate tracker (i.e., channel 3) is on the detected secondary reflector, SR, while the remaining range channels (i.e., channels 1 and 2) continue to search for another reflector in front of the one under track by the target energy monitoring/range tracking system $46_S$. Note that in the FIG. 6B, individual channels are shown for each dwell when used as independent range channels in the target energy monitoring system. When target angle LOS tracking (i.e., monopulse) measurements are being made by the target angle/range tracking system $46_P$, all channels are collocated by the target angle/range tracking system $46_P$ and are not individually indicated since they are all being gated to the centroid, C, as indicated at the right side of the lower portion of FIG. 6B. In addition, the split gate tracker is denoted by the vertically broken lines in the middle of a "look" (i.e., range gate window) for both the first and fourth dwells and the second and third dwells. The split gate tracker, SG, provides finer range resolution within the range gate with which it is associated. It should be noted that, during the range gate signals on lines $40_1, 40_2, 40_3$ for the target angle/range tracking system $46_P$ during the subsequent PHASE 2 will be $T_2$.

It should also be noted that during dwells two and three of PHASE 1, the target angle/range tracking system $46_P$ continues to track the centroid, C, (in range and angle) with a larger range gate pulse width, Δ, centered at T, than the range gate pulse width Δ' used by the target energy monitoring/range tracking system $46_S$ during the first and four dwells. In general, the waveform that is generating both range and angle (i.e., monopulse) measurements operates in the center 2 dwells (i.e., the second and third dwells) so as not to impact the line-of-sight reconstruction done in the guidance algorithms.

PHASE 2

Figure 6C:
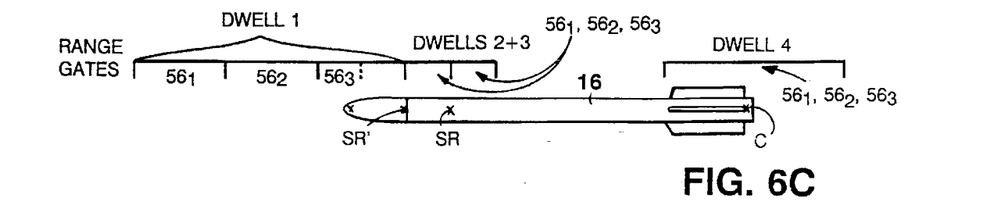

FIG. 6C depicts the operation once the secondary reflector, SR, has sufficient S/N to support low noise monopulse measurements of guidance; i.e., a secondary reflector, SR, forward of the centroid, C, has been detected. At this time the target angle/range tracking system $46_P$ uses the center two dwells (i.e., the second and third dwells) and short pulse to provide target angle/range tracking LOS (monopulse) target angle/range tracking data for the secondary reflector, SR, and the larger pulse, Δ, is used by the target angle/range tracking system $46_P$ for dwell 4. As noted above, the range gate signal for the target angle/range tracking system $46_P$ during the subsequent PHASE 2 will be $T_2$; and the range error signal $\Delta R_{TM}$ produced by the target angle/range tracking system $46_P$ is fed to the angle/range tracking filters 74 (FIG. 3) to maintain range tracking of the secondary reflector, SR, during the second and third dwells by the target angle/range tracking system $46_P$. It should be noted that, the fourth dwell is used by the target angle/range tracking system $46_P$ to provide angle/range tracking data of the centroid, C, in the case of a target fade. (That is, the fourth dwell maintains target angle/tracking data in case of a target fade; however, the data obtained during the second and third dwells are used by the target angle/range tracking system $46_P$ to track the detected secondary reflector, SR, and guide the missile 12 towards the detected secondary reflector, SR. During the remaining dwell (i.e., the first dwell), the target energy monitoring/range tracking system $46_S$ continues to monitor and track another "secondary" reflector, SR', in front of the secondary reflector, SR, now providing target angle/range tracking data to direct the missile 12 towards such secondary reflector, SR.

PHASE 3

Figure 6D:
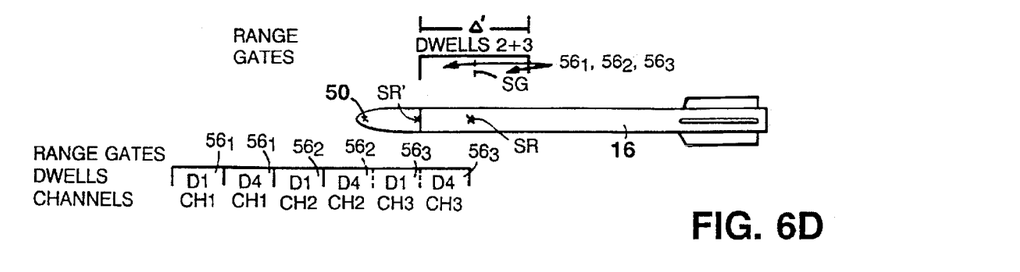

Referring now to FIG. 6D, at 2 guidance time constants prior to intercept, use of the (½) Δ' pulse width is initiated to maximize the resolution capability and locate the nose 50 (FIGS. 1 and 6D) of the target 16. During the center 2 dwells (i.e. the second and third dwells) the target angle/range tracking system $46_P$ continue to provide angle/range tracking information from energy at the detected secondary reflector, SR. Here, the radar transmitter pulse widths are small (i.e., here, Δ' in duration). The centroid, C, track during the fourth dwell of PHASE 2 is dropped at this point so the other two dwells (i.e. the first and fourth dwells) may search for the target nose i.e., the target energy monitoring/ range tracking system $46_S$ monitors energy from points forward of the detected secondary reflector, SR, during the first and fourth dwells). Prior to the nose 50 being located by energy monitoring during the first and fourth dwells, the (½) Δ' "looks", i.e., range gate windows, (½) Δ', are spread out, forwardly, to search out the maximum range extent as shown in FIG. 6D. It is also noted that channel 3 (CH 3) is range gated in time by range gate $56_3$ so that it is centered at the forward half of the range gate window used by the second and third dwells. Channel 3 is used during the first dwell (D1) and is range gated just forward of the range gate used for channel 3 during the fourth dwell (D4). The fourth dwell and first dwell (D4, D1, respectively) are ranged gated in channel 2 (CH 2) and channel 1 (CH 1) by range gates $56_2$, $56_1$, respectively, successively, as shown, forward of the range gate $56_3$ used in channel 3 (CH 3), as indicated.

PHASE 4

Figure 6E:
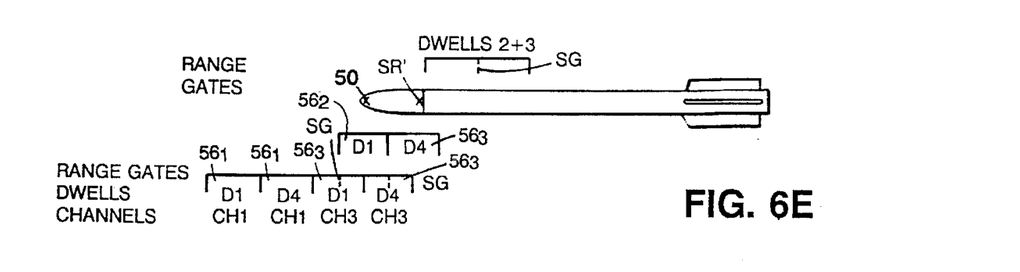

PHASE 4 is the final operational configuration of the radar system. Thus, referring to FIG. 6E, after a reflector the farthest in front of the monopulse target angle/range track point is detected and assumed to be the nose 50. The center two dwells (i.e., the second and third dwells) are used by the target angle/range tracking system $46_P$ to track the target leading edge with the one $\Delta'$ duration to provide good quality monopulse angle/range tracking data. The target energy monitoring/range tracking system $46_S$ uses the (½) $\Delta'$ duration only "looks" (i.e. range gate windows) are staggered to provide maximum resolution and accuracy in tracking the target nose 50.

The decision of when to switch to the finer range gate and not use monopulse target angle data is a tradeoff between time-to-go and the quality of monopulse data for target scatter points just crossing the acquisition threshold. The TABLE below shows the relative radar cross-section of two TBM targets 1 and 2:

TABLE

| Aspect Angle | Target 2 (relative dB) | | | Target 1 (relative dB) | | |
|---|---|---|---|---|---|---|
| | Nose | Lead Edge | Centroid | Nose | Lead Edge | Centroid |
| 0 | −31 | None | −3 | −28 | −8 | 0 |
| 10 | −32 | None | −8 | −28 | −15 | −7 |
| 20 | −35 | None | −15 | −30 | −18 | −10 |

(Cross section data is relative to target 1 centroid, 0 aspect and normalize to zero maximum)

Figure 7A:
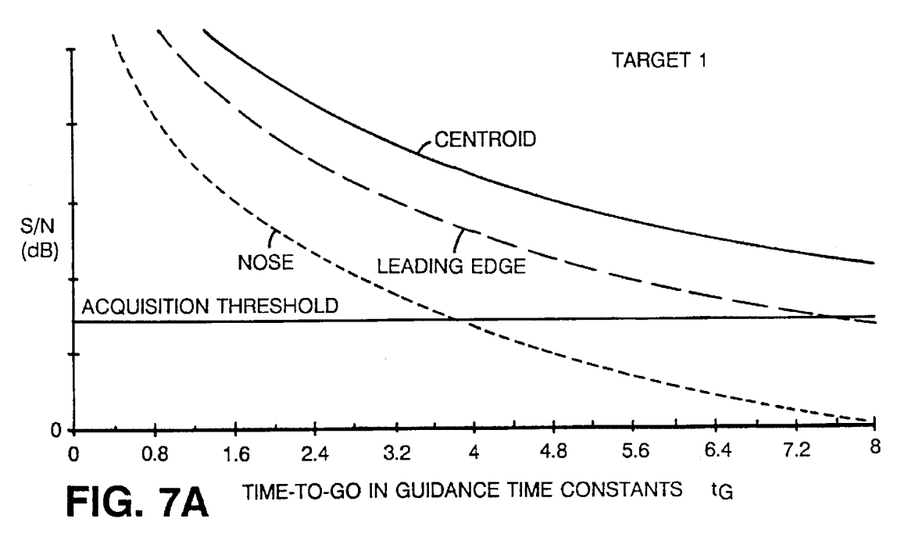
FIGS. 7A and 7B are diagrams useful in understanding the criteria used to enter an aim point adjustment phase of the radar system of FIG. 1; and, FIG. 8 is a diagram useful in understanding the generation of signals by the radar system of FIG. 1 to guide the missile to the target during the aim point adjustment phase.
Figure 7B:
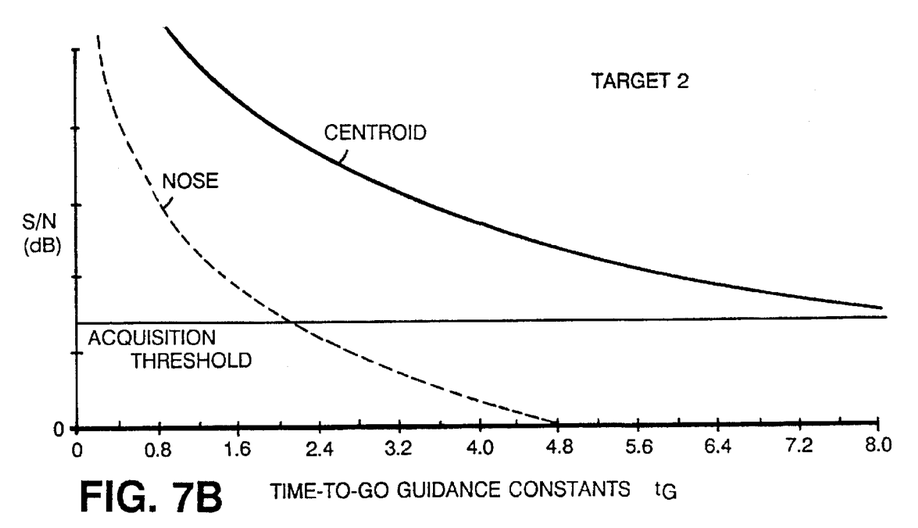

The nose of the target refers to the tip, the leading edge of the target is the joint between the nose cone and the main body, and the centroid, $\acute{C}$, is the total body return. FIGS. 7A and 7B present the predicted signal-to-noise ratio (S/N) versus guidance time constant for targets 1 and 2, respectively. Target 2 has a higher closing velocity then target 1 by a factor of 1.4. For target 1 the leading edge would be under target angle/range track at 7.6 guidance time constants and the nose under target angle/range track at 3.6 time constants. Target 1 would not require aim point adjustment since the leading reflector, the nose, is detected before 2 guidance time constants. Due to the higher closing velocity of target 2 and the slightly smaller radar cross-section, the nose of target 2 is expected to be acquired approximately 2 guidance time constants prior to intercept. For this target aim point adjustment would be required.

AIM POINT ADJUSTMENT

Finally, a predetermined time prior to intercept, (e.g., 2 guidance time constants) if a "secondary" reflector is detected by the target energy monitoring system forward of the region being angle/range tracked by the target angle/range tracking system $46_P$, an aim point adjustment phase commences. During this phase, an aim point correction to the guidance system is calculated from an estimate of the intercept geometry and the difference in range between the two reflectors.

Figure 8:
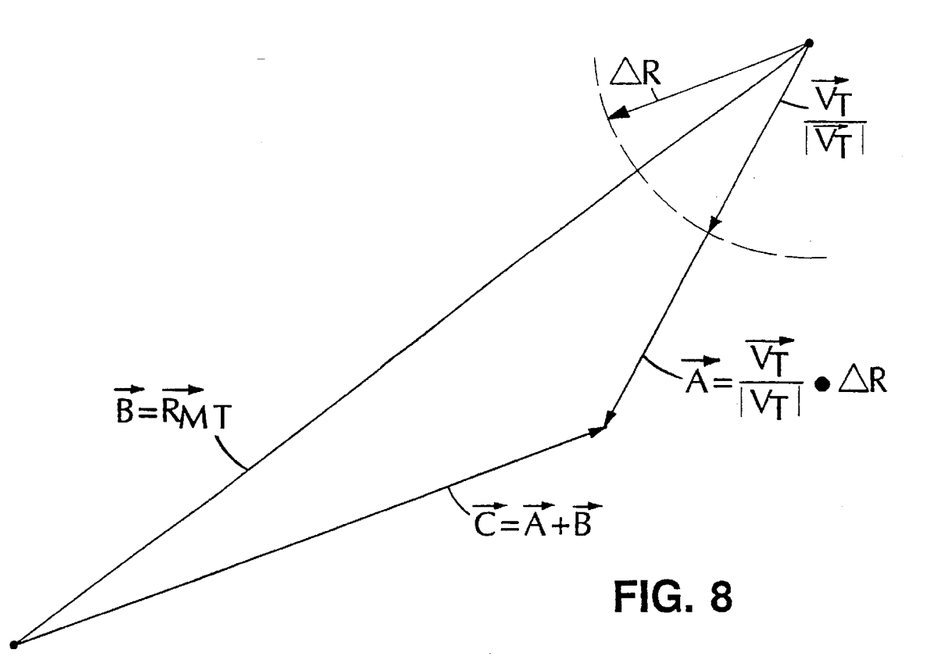

More particularly, a mathematical solution is used to guide the interceptor missile 12 to the target vulnerable area once the nose is found relative to the most forwardly detected, and tracked secondary reflector, SR. This method is selected as opposed to tracking based on target angle tracking data from the monopulse antenna to the nose, due to the typically small radar cross section resulting in a low S/N ratio. This low S/N results in monopulse angle tracking noise; however, the range tracking is less susceptible to low S/N. The aim point corrections are calculated in a seeker coordinate system to allow for some simplifications. FIG. 8 illustrates the items calculated in determining the aim point corrections for the planar case.

The first step in calculating the aim point is to estimate the target velocity vector, $\overline{V}_T$, in the seeker coordinate system. Such calculation is described in the copending U.S. patent application. After the target velocity vector, $\overline{V}_T$, is determined, a target velocity unit vector, $\overline{V}_T/|\overline{V}_T|$, is calculated. The calculated unit vector, $\overline{V}_T/|\overline{V}_T|$, is used to determine: $\overline{A}=[\overline{V}_T/|\overline{V}_T|]\Delta R$, where $\Delta R$ is the difference in the range between the last two detected reflectors of target 16. The target tracking signal fed to the guidance computer guiding the missile 12 to the target is $\overline{C}=\overline{A}+\overline{B}$ where $\overline{B}$ is the target vector $R_{RT}$ from the guidance filters 78 which are based on the angle/tracking system measurements.

That is, in summary, a predetermined time prior to intercept, if a "secondary" reflector is detected by the target energy monitoring/range tracking system $46_S$ forward of the region being angle/range tracked by the target angle/range tracking system $46_P$, an aim point adjustment phase commences. During this phase, an adjustment to the guidance system is calculated from an estimate of the intercept geometry and the difference in range between the last two detected target reflectors. More particularly, a vector, $\overline{A}$, is computed having as a magnitude, the difference in range between the last two detected target reflectors and a direction along the target velocity. The target velocity vector is the vector sum of the missile 12-target 16 relative velocity vector, $\overline{V}_{MT}$, the determination of which is described in the above referenced copending patent application, for example, and the missile 16 velocity, $\overline{V}_M$, relative to the ground, as determined by the inertial guidance system 34. The vector, $\overline{B}$, is also calculated, such vector $\overline{B}$ being the velocity of the target, as determined by the guidance system 78. The vector, $\overline{C}$, is calculated, where $\overline{C}$=the vector sum of the vectors $\overline{A}$ and $\overline{B}$. The angle between the vectors $\overline{A}$ and $\overline{C}$, is used as the angle error signal to guide the interceptor missile 12 to the target 16.

Other embodiments are within the spirit and scope of the appended claims.

What is claimed is:

1. A radar system for tracking radar energy reflected by a point on a target different from the centroid of a target's radar reflected energy, the radar system comprising:

a radar receiver for receiving target radar reflected energy;

a target angle/range tracking system;

a target energy monitoring/range tracking system; and, a processor for:

directing, during a first mode, the target angle/range tracking system to track the centroid of the target's reflected energy and the secondary energy monitoring system to monitor reflected energy from other points of the target, and when the signal to noise ratio from a reflection from one of the other points of the target monitored by the target energy monitoring system exceeds a predetermined level, directing, during a second mode, the target angle/range target tracking system to track the reflection from the second point of the target while the secondary energy monitoring system monitors other points on the target.

2. The radar system recited in claim 1 wherein the radar system includes a range gate section for passing range gating signals produced by the receiver to the processor in response to a range gate signal.

3. The system recited in claim 2 wherein the radar receiver produces monopulse sum and difference tracking signals, and wherein:

during the first mode, the processor directs the sum and difference tracking signal to the range gating section through a plurality of channels to the target angle/range tracking system, and;

during the second mode, the processor directs the sum signal to the range gating section through the plurality of channels to the target energy monitoring system while the difference signals are inhibited from passing through the plurality of channels to the target energy monitoring system.

4. A radar system for tracking radar energy reflected by a point on a target different from the centroid of a target's radar reflected energy, such radar system comprising:

a target angle/range tracking system and a target energy monitoring system; and, a processor for, during a first mode of operation, enabling the target angle/range tracking system to track the centroid of the target's reflected energy and the secondary energy monitoring system to monitor the strength of energy reflected from points along the body of the target different from the centroid reflected energy producing region and when the signal strength to noise ratio from a reflection at one of the monitored points along the target exceeds a predetermined level indicating detection of a secondary reflector along the body of the target, to commence a second operation mode; and during the second operating mode enabling the target angle/range tracking system to track the energy from the secondary reflector, and the target energy monitoring to monitor energy reflected from points along the target's body different from the secondary reflector.

5. The system recited in claim 4 wherein the target is an incoming tactical ballistic missile and the radar system is carried by a guided, interceptor missile, and during the first mode of operation the centroid of the reflected energy is located near the rear, tail section of the incoming missile, the target angle/range tracking system tracks such energy and directs the missile toward the rear, tail section of the incoming missile; and, the secondary energy monitoring system monitors the strength of reflected energy from points along the body of the target forward of the rear, tail section of the incoming missile and when the signal strength to noise ratio from a reflection at one of the monitored points along the incoming missile forward of the centroid exceeds a predetermined level indicating detection of the secondary reflector, the second operation mode commences, and during the second operating mode, the target angle/range tracking system tracks the energy from the secondary reflector, and directs the interceptor missile towards the forwardly located secondary reflector; and, the target energy monitoring monitors energy reflected from points along the target's body forward of the detected secondary reflector.

* * * * *